(12) United States Patent
Chu et al.

(10) Patent No.: US 8,301,981 B2
(45) Date of Patent: Oct. 30, 2012

(54) DATA ACCESS METHOD FOR FLASH MEMORY AND STORAGE SYSTEM AND CONTROLLER THEREOF

(75) Inventors: Chien-Hua Chu, Hsinchu County (TW); Kuo-Yi Cheng, Taipei (TW)

(73) Assignee: Phison Electronics Corp., Miaoli (TW)

( * ) Notice: Subject to any disclaimer, the term of this patent is extended or adjusted under 35 U.S.C. 154(b) by 724 days.

(21) Appl. No.: 12/486,523

(22) Filed: Jun. 17, 2009

(65) Prior Publication Data
US 2010/0262892 A1    Oct. 14, 2010

(30) Foreign Application Priority Data
Apr. 10, 2009  (TW) .............................. 98112018 A (51) Int. Cl.
*G11C 29/00*  (2006.01)
(52) U.S. Cl. ..................... 714/773; 714/807; 714/703
(58) Field of Classification Search .................. 714/773, 714/807, 103, 5, 8
See application file for complete search history.

(56) References Cited

U.S. PATENT DOCUMENTS

| | | | |
|---|---|---|---|
| 5,754,567 A * | 5/1998 | Norman | 714/773 |
| 6,601,211 B1 * | 7/2003 | Norman | 714/773 |
| 6,725,321 B1 * | 4/2004 | Sinclair et al. | 711/103 |
| 2006/0036897 A1 * | 2/2006 | Lin et al. | 714/5 |

* cited by examiner

*Primary Examiner* — Fritz Alphonse
(74) *Attorney, Agent, or Firm* — J.C. Patents (57) ABSTRACT

A data access method for accessing data in a flash memory is provided, wherein the data has a plurality of sub-data. The data access method includes generating an error correction code (ECC) for the data and writing the data and the ECC into the flash memory. The data access method also includes generating a corresponding bit checking code for each of the sub-data and writing the bit checking codes into the flash memory. When the sub-data subsequently is read from the flash memory, whether the sub-data contains any error is determined only according to the bit checking code corresponding to the sub-data. Thereby, the data access efficiency is improved.

25 Claims, 6 Drawing Sheets

DATA ACCESS METHOD FOR FLASH MEMORY AND STORAGE SYSTEM AND CONTROLLER THEREOF

CROSS-REFERENCE TO RELATED APPLICATION

This application claims the priority benefit of Taiwan application serial no. 98112018, filed on Apr. 10, 2009. The entirety of the above-mentioned patent application is hereby incorporated by reference herein and made a part of specification.

BACKGROUND

1. Technology Field

The present invention relates to a data access method for a flash memory, and a flash memory storage system and a flash memory controller using the same.

2. Description of Related Art

In recently years, the consumers' demand to storage media for storing digital contents has increased drastically along with the widespread of digital cameras, cell phones, and MP3. Flash memory is one of the most adaptable storage media to be carried around and used for storing digital files due to its characteristics such as data non-volatility, low power consumption, small volume, and non-mechanical structure. A solid state drive (SSD) is a storage device which uses a flash memory as its storage medium, and SSD has been broadly applied into host computer systems as the primary hard disk.

While accessing data in a flash memory storage system which adopts a flash memory as its storage medium, the flash memory storage system executes an error correcting procedure through an error correcting circuit to verify whether the accessed data is correct. To be specific, when a user is about to write data into the flash memory storage system, the flash memory storage system generates an error correction code (ECC) for the data and writes the data and the ECC into the flash memory. Subsequently, when the user is about to read the data, the flash memory storage system reads the data and the ECC thereof from the flash memory and corrects the data according to the ECC, so as to make sure that the data is correct. In particular, the error correcting circuit and the ECC may vary along with different correction capability. Namely, an error correcting circuit and an ECC of a lower level can only check and correct fewer error bits, while an error correcting circuit and an ECC of a higher level checks and corrects more error bits, wherein the higher-level ECC requires a larger storage space than the lower-level ECC.

Generally speaking, a flash memory in a flash memory storage system includes a plurality of physical blocks, each of the physical blocks has a plurality of pages, and data is written into the flash memory in unit of pages. Each page is divided into a data area and a redundant area, wherein the data area stores data to be written, and the redundant area stores control information related to the page and an ECC. For example, if each page contains one sector (i.e., 512 bytes), 512 bytes are allocated to the data area in this page and 16 bytes are allocated to the redundant area in this page, wherein 6 bytes in the redundant area are used for storing the control information of the page and the other 10 bytes are used for storing the ECC of this page, namely, 10 bytes is enough for storing the ECC corresponding to the data of 512 bytes.

The capacity of each page has been continuously increased along with the advancement of flash memory techniques. For example, presently, there is already such flash memory that has each page thereof containing 4 sectors (i.e., 2048 bytes). Along with the increase in the number of bytes in each page, the error correction capability of the ECC of the page has to be improved accordingly in order to ensure the correction of data stored in the page. Thus, in a page having a data area allocated with 2048 bytes, the redundant area is allocated with 61 bytes, wherein 8 bytes are used for storing the control information while the other 53 bytes are used for storing the ECC corresponding to the data of 2048 bytes.

Generally speaking, a computer system accesses data in unit of sectors. Thus, in a flash memory storage system having each page in its flash memory composed of 4 sectors, because the ECC in each page is generated corresponding to the data of 4 sectors, when the computer system only reads data of one sector from the page, the flash memory storage system still has to read the data in the entire page (i.e., the data of 4 sectors) and executes the error correcting procedure according to the corresponding ECC. Thus, the data access efficiency of the flash memory storage system is seriously reduced when the computer system reads small data.

SUMMARY

Accordingly, the present invention is directed to a data access method which can effectively improve the data access efficiency of a flash memory.

The present invention is also directed to a flash memory controller using the data access method which can effectively improve the data access efficiency of a flash memory.

The present invention is further directed to a flash memory storage system using the data access method which can effectively improve the data access efficiency of a flash memory.

The present invention provides a data access method to access data in a flash memory. The data access method includes receiving the data from a host system, wherein the data has a plurality of sub-data. The data access method also includes generating an error correction code (ECC) for the data and writing the data and the ECC into the flash memory. The data access method further includes generating a corresponding bit checking code for each of the sub-data and writing the corresponding bit checking codes into the flash memory.

The present invention also provides a flash memory controller to access data in a flash memory. The flash memory controller includes a microprocessor unit and a host interface unit, a flash memory interface unit, a memory operation unit, an error correction unit, and a bit checking unit separately coupled to the microprocessor unit. The host interface unit connects to a host system and receives the data from the host system, wherein the data has a plurality of sub-data. The flash memory interface unit connects to the flash memory. The error correction unit generates an ECC for the received data, and the memory operation unit writes the received data and the ECC thereof into the flash memory. The bit checking unit generates a bit checking code for each of the sub-data, and the memory operation unit writes the generated bit checking codes into the flash memory.

The present invention further provides a flash memory storage system including a flash memory and a flash memory controller coupled to the flash memory. The flash memory controller receives data from a host system, wherein the data has a plurality of sub-data. The flash memory controller generates an ECC for the data and writes the data and the ECC into the flash memory. The flash memory controller further generates a bit checking code for each of the sub-data and writes the generated bit checking codes into the flash memory.

As described above, in the present invention, when the host system is about to read a small data less than one page, whether the small data contains any error bit is determined so that it is not necessary to read the data in the entire page and the ECC thereof. Accordingly, the data access efficiency is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 1:
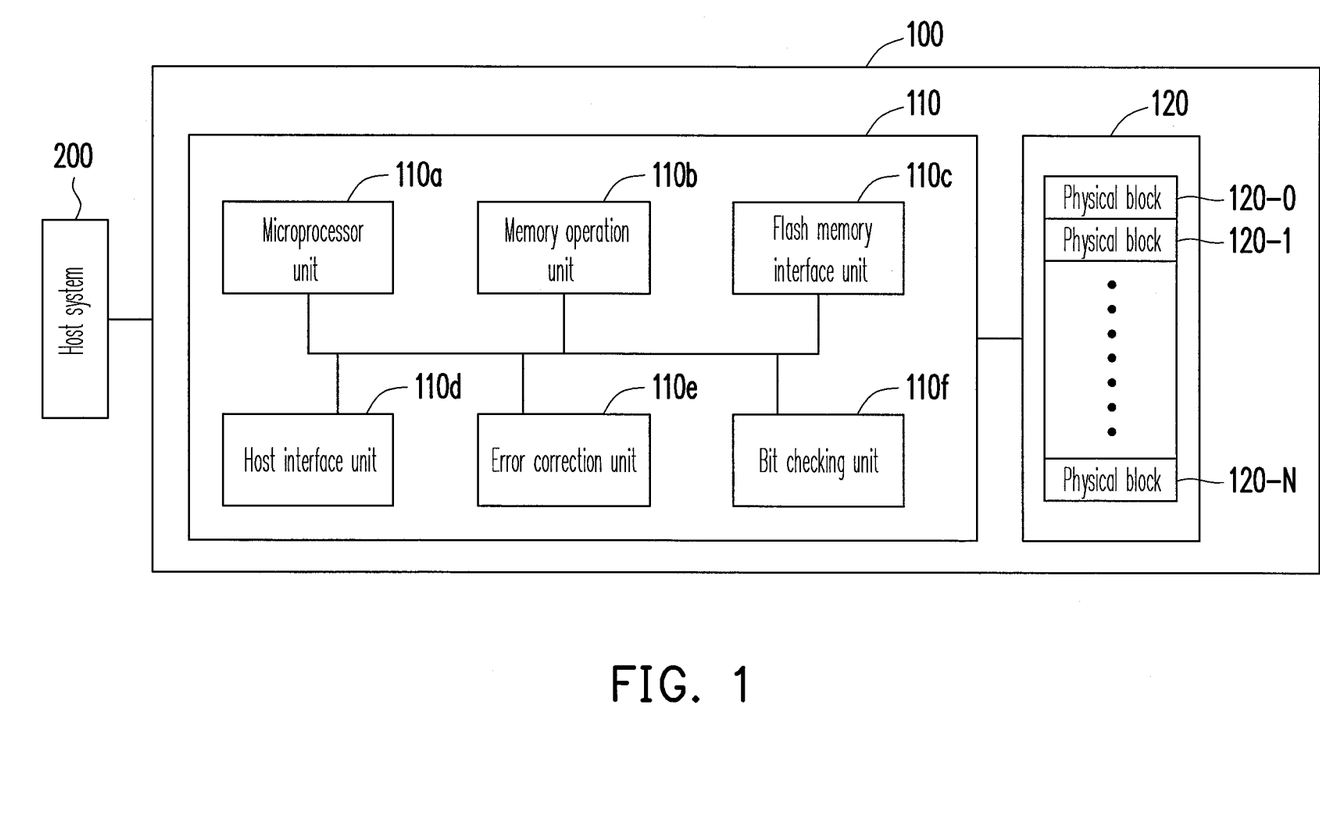
FIG. 1 is a schematic block diagram of a flash memory storage system according to an exemplary embodiment of the present invention.

FIG. 1 is a schematic block diagram of a flash memory storage system according to an exemplary embodiment of the present invention.

Referring to FIG. 1, the flash memory storage system 100 usually works together with a host system 200 to allow the host system 200 to write data into or read data from the flash memory storage system 100. In the present exemplary embodiment, the flash memory storage system 100 is a solid state drive (SSD). However, in another embodiment of the present invention, the flash memory storage system 100 may also be a memory card or a flash drive.

The flash memory storage system 100 includes a flash memory controller 110 and a flash memory chip 120.

The flash memory controller 110 executes a plurality of logic gates or control instructions implemented as a hardware form or a firmware form, and accesses data in the flash memory chip 120 according to commands of the host system 200. The flash memory controller 110 includes a microprocessor unit 110a, a memory operation unit 110b, a flash memory interface unit 110c, a host interface unit 110d, an error correction unit 110e, and a bit checking unit 110f.

The microprocessor unit 110a controls the operation of the flash memory controller 110. To be specific, the microprocessor unit 110a cooperates with the memory operation unit 110b, the flash memory interface unit 110c, the host interface unit 110d, the error correction unit 110e, and the bit checking unit 110f to carry out the operations of writing, reading or erasing data of the flash memory storage system 100.

The memory operation unit 110b is coupled to the microprocessor unit 110a and executes a block management mechanism. In particular, the memory operation unit 110b executes the data access mechanism in the present exemplary embodiment.

In the present embodiment, the memory operation unit 110b is implemented in the flash memory controller 110 as a firmware form. For example, a plurality of control commands is burnt into a program memory (for example, a read only memory, ROM), and the program memory is embedded into the flash memory controller 110 as the memory operation unit 110b. When the flash memory storage system 100 is started, the control commands in the memory operation unit 110b are executed by the microprocessor unit 110a so that the block management mechanism and the data access mechanism in embodiments of the present invention can be accomplished.

In another embodiment of the present invention, the control commands of the memory operation unit 110b may also be stored into a specific area of the flash memory chip 120 as a software form. Similarly, when the flash memory storage system 100 is started, the control commands of the memory operation unit 110b are executed by the microprocessor unit 110a. In yet another embodiment of the present invention, the memory operation unit 110b may also be implemented in the flash memory controller 110 as a hardware form.

The flash memory interface unit 110c is coupled to the microprocessor unit 110a and used to access the flash memory chip 120. Namely, data to be written into the flash memory chip 120 is converted by the flash memory interface unit 110c into a format acceptable to the flash memory chip 120.

The host interface unit 110d is coupled to the microprocessor unit 110a and used to receive and identify commands received from the host system 200. Namely, the commands and data received from the host system 200 are transmitted to the microprocessor unit 110a through the host interface unit 110d. In the present exemplary embodiment, the host interface unit 110d is a Serial Advanced Technology Attachment (SATA) interface. However, the present invention is not limited thereto, and the host interface unit 110d may also be an Universal Serial Bus (USB) interface, an Institute of Electrical and Electronics Engineers (IEEE) 1394 interface, a Peripheral Component Interconnect (PCI) Express interface, an Memory Stick (MS) interface, an Multi Media Card (MMC) interface, an Secure Digital (SD) interface, a Compact Flash (CF) interface, an Integrated Drive Electronics (IDE) interface, or other suitable data transmission interface.

The error correction unit 110e is coupled to the microprocessor unit 110a and executes an error correcting procedure. To be specific, when data input into the error correction unit 110e, the error correction unit 110e generates an error correction code (ECC) according to the data, and when data and an ECC input into the error correction unit 110e, the error correction unit 110e checks and corrects the data according to the ECC. The error correcting procedure is a well-known technique for data storage media therefore will not be described herein. It should be mentioned that the error correction capability of the error correction unit 110e should meet the specification of the flash memory chip 120. In the present exemplary embodiment, the error correction unit 110e can check and correct up to 48 error bits. However, the present invention is not limited thereto, it is within the scope of the present invention as long as the error correction unit 110e meets the specification of the flash memory chip 120.

The bit checking unit 110f is coupled to the microprocessor unit 110a and executes an error detection procedure. To be specific, when data input into the bit checking unit 110f, the bit checking unit 110*f* generates a bit checking code according to the data, and when data and a bit checking code input into the bit checking unit 110*f*, the bit checking unit 110*f* checks the data according to the bit checking code. For example, in the present exemplary embodiment, the bit checking unit 110*f* is implemented as an error detecting circuit, and the bit checking unit 110*f* generates an error detection code (EDC) as the bit checking code. However, in another embodiment of the present invention, the bit checking unit 110*f* may also be implemented as a cyclic redundancy check (CRC) circuit, and the bit checking unit 110*f* generates a CRC code as the bit checking code. In yet another embodiment of the present invention, the bit checking unit 110*f* may also be implemented as a low-level error correcting circuit, and the bit checking unit 110*f* generates a low-level ECC as the bit checking code, wherein the low-level error correcting circuit and the low-level ECC having lower error correction capability compared to the error correction unit 110*e* and the ECC thereof.

In addition, even though not shown in the present exemplary embodiment, the flash memory controller 110 may also include other general function modules to control the flash memory, such as a buffer and a power management unit, etc.

The flash memory chip 120 is coupled to the flash memory controller 110 and has a plurality of physical blocks 120-0~120-N to store data. In the present exemplary embodiment, the flash memory chip 120 is a multi level cell (MLC) NAND flash memory. However, the present invention is not limited thereto, and in another embodiment of the present invention, the flash memory chip 120 may also be a single level cell (SLC) NAND flash memory.

Figure 2:
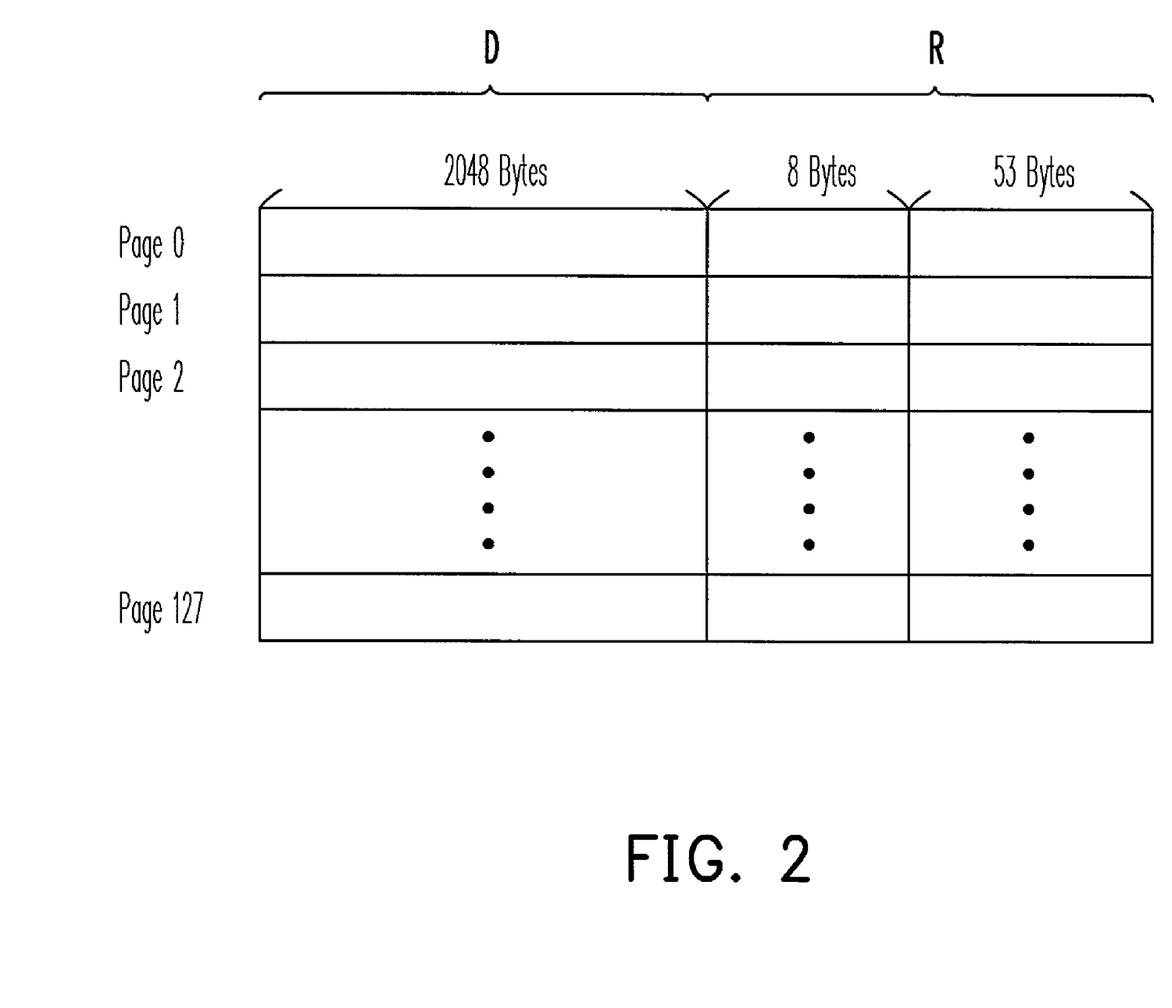
FIG. 2 is a schematic block diagram of a physical block according to an exemplary embodiment of the present invention.

FIG. 2 is a schematic block diagram of a physical block according to an exemplary embodiment of the present invention. In the present exemplary embodiment, the physical blocks 120-0~120-N all have the same structure, and the schematic block diagram in FIG. 2 is applicable to each of the physical blocks 120-0~120-N.

Referring to FIG. 2, a physical block includes 128 pages, and each page can store data of 4 sectors. To be specific, the data area D in each page has 2048 bytes, and the redundant area R in each page has 61 bytes, wherein 8 bytes in the redundant area R are used to store control information related to the page, and 53 bytes are used to store the ECC of the page.

Figure 3:
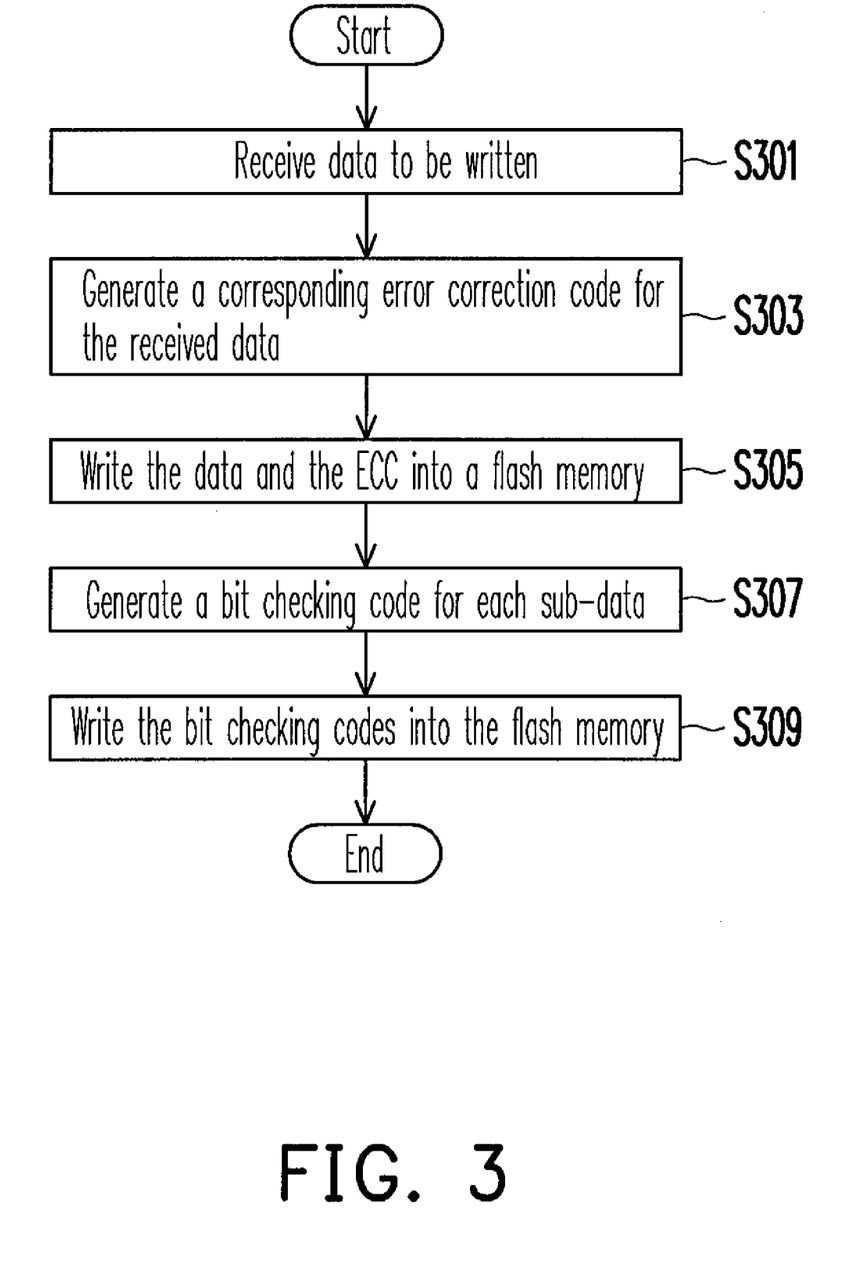
FIG. 3 is a flowchart of data writing process according to an exemplary embodiment of the present invention.

FIG. 3 is a flowchart of data writing process according to an exemplary embodiment of the present invention.

Referring to FIG. 3, when the host system 200 is about to write data into the flash memory storage system 100, in step S301, the flash memory controller 110 receives the data to be written from the host system 200. In the present exemplary embodiment, the received data has at least one sub-data, and the size of the sub-data is the minimum access unit (i.e., sector) of the host system 200. For example, if the access unit of the host system 200 is 512 bytes, the size of the sub-data is also 512 bytes. To be specific, the flash memory controller 110 receives a write command and sub-data corresponding to the write command from the host system 200 through the host interface unit 110*d*.

Then, in step S303, the flash memory controller 110 generates an ECC for the received data. To be specific, the data received by the host interface unit 110*d* is transmitted to the error correction unit 110*e*, and the error correction unit 110*e* generates the corresponding ECC.

Next, in step S305, the memory operation unit 110*b* of the flash memory controller 110 writes the data and the corresponding ECC into the physical blocks 120-0~120-N of the flash memory chip 120 through the flash memory interface unit 110*c*.

After that, in step S307, the flash memory controller 110 generates a corresponding bit checking code for each sub-data. To be specific, each sub-data is transmitted to the bit checking unit 110*f*, and the bit checking unit 110*f* generates a corresponding bit checking code for the sub-data.

Finally, in step S309, the memory operation unit 110*b* writes the bit checking codes into the physical blocks 120-0~120N of the flash memory chip 120 through the flash memory interface unit 110*c*. It should be mentioned that in the present exemplary embodiment, because the redundant area of a page is only enough for storing the ECC corresponding to the data when the data is written into the page, the bit checking codes generated corresponding to the sub-data are stored into the data area of another physical block. Namely, the memory operation unit 110*b* writes the bit checking codes into the flash memory chip 120 as general data. In the present exemplary embodiment, the memory operation unit 110*b* establishes a bit checking code table 400 for recording the bit checking codes.

Figure 4:
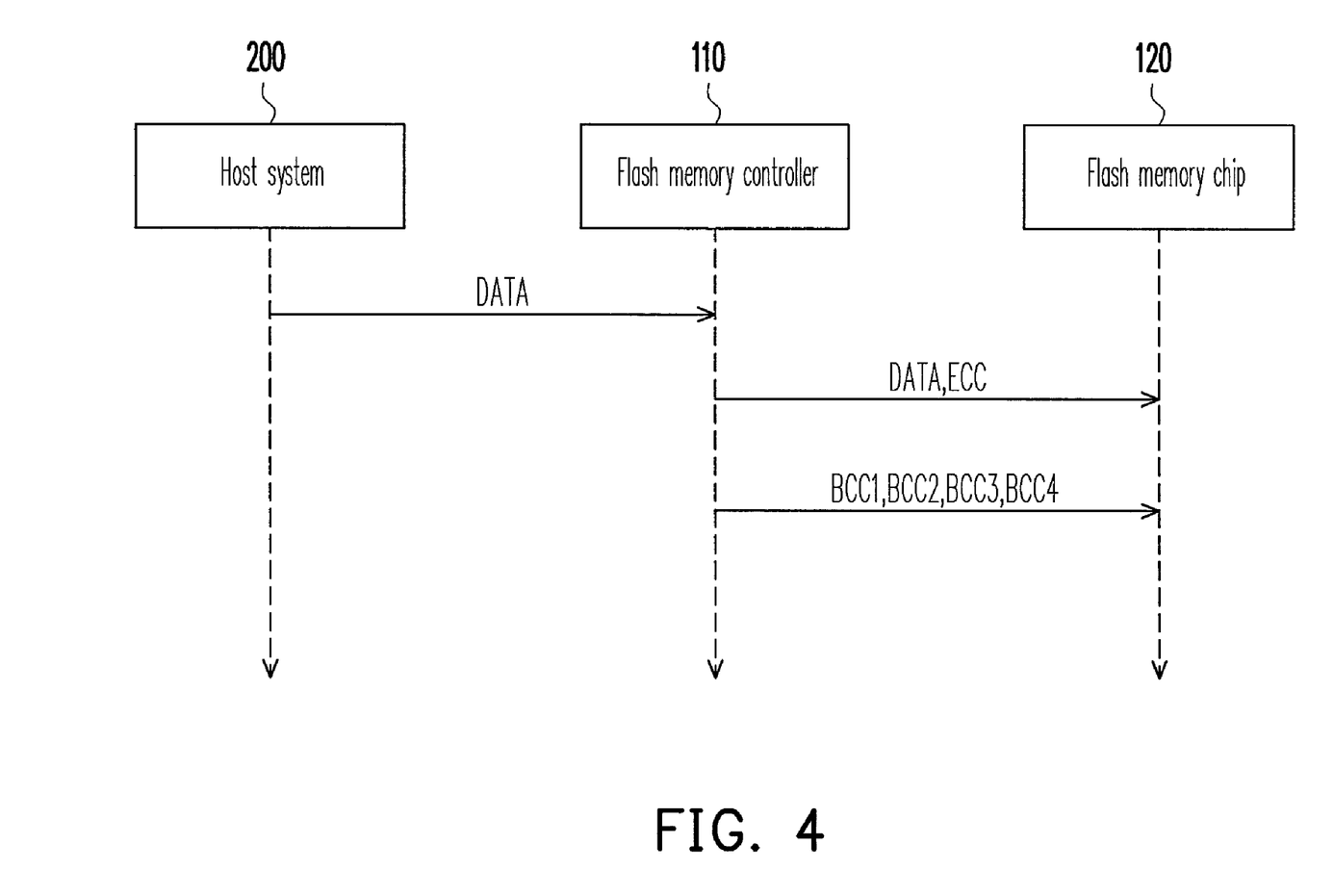
FIG. 4 is a diagram illustrating how data is written into a flash memory according to an exemplary embodiment of the present invention.

FIG. 4 is a diagram illustrating how data is written into a flash memory according to an exemplary embodiment of the present invention.

Referring to FIG. 4, if the flash memory controller 110 receives data of 2048 bytes (referring as DATA hereafter) from the host system 200, the flash memory controller 110 generates an error correction code ECC for the DATA. Besides, the flash memory controller 110 divides the DATA into sub-data DATA1, DATA2, DATA3, and DATA4 and sequentially generates the corresponding bit checking codes BCC1, BCC2, BCC3, and BCC4. Thereafter, the DATA composed of the sub-data DATA1, DATA2, DATA3, and DATA4 is written into page 0 of the physical block 120-0 together with the error correction code ECC thereof. Meanwhile, the flash memory controller 110 writes the bit checking code table 400 containing the bit checking codes BCC1, BCC2, BCC3, and BCC4 into the page 0 of the physical block 120-N.

Figure 5:
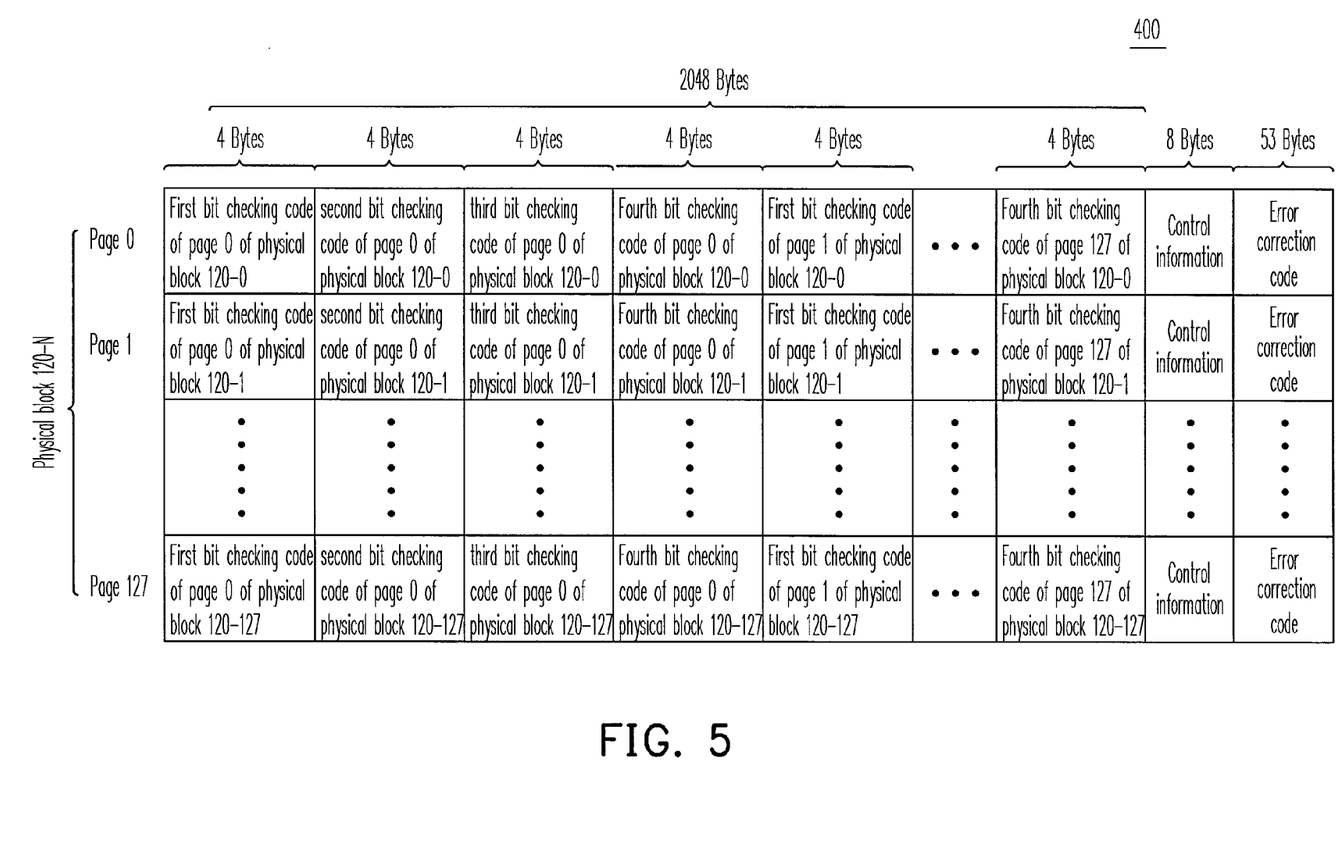
FIG. 5 illustrates an example of storing a bit checking code table into a physical block according to an exemplary embodiment of the present invention.

FIG. 5 illustrates an example of storing a bit checking code table into a physical block according to an exemplary embodiment of the present invention.

Referring to FIG. 5, for example, the bit checking code table 400 for recording the bit checking codes of the physical blocks 120-0~120-127 are stored in the physical block 120-N. In the present exemplary embodiment, since each sub-data has 512 bytes and the bit checking code of the sub-data requires a storage space of 4 bytes, each physical block can store the bit checking codes corresponding to 128 physical blocks. In particular, because the memory operation unit 110*b* stores the bit checking code table 400 as general data, the redundant area in the physical block stores the ECC corresponding to the bit checking codes. In another exemplary embodiment of the present invention, the memory operation unit 110*b* establishes a bit checking code mapping table for recording the mapping relationship between the bit checking codes in the bit checking code table and the sub-data, such that the bit checking codes corresponding to the sub-data can be read from the bit checking code table.

It should be mentioned that a large storage space is required to establish the bit checking code table 400 for all the physical blocks in the flash memory chip 120. Accordingly, in another exemplary embodiment of the present invention, the memory operation unit 110*b* only establishes the bit checking code table 400 for those physical blocks in which small-quantity data is often accessed (i.e., data less than one page). For example, the host system 200 often reads small data in the physical block for storing the file allocation table (FAT). Thereby, the memory space required for storing the bit checking code table 400 can be reduced.

In addition, because the bit checking code table 400 is constantly updated, during the operation of the flash memory storage system 100, the bit checking code table 400 is loaded from the flash memory chip 120 into a buffer (not shown) to be updated, and when the flash memory storage system 100 is turned off, the bit checking code table 400 is written back into the flash memory chip 120.

Figure 6:
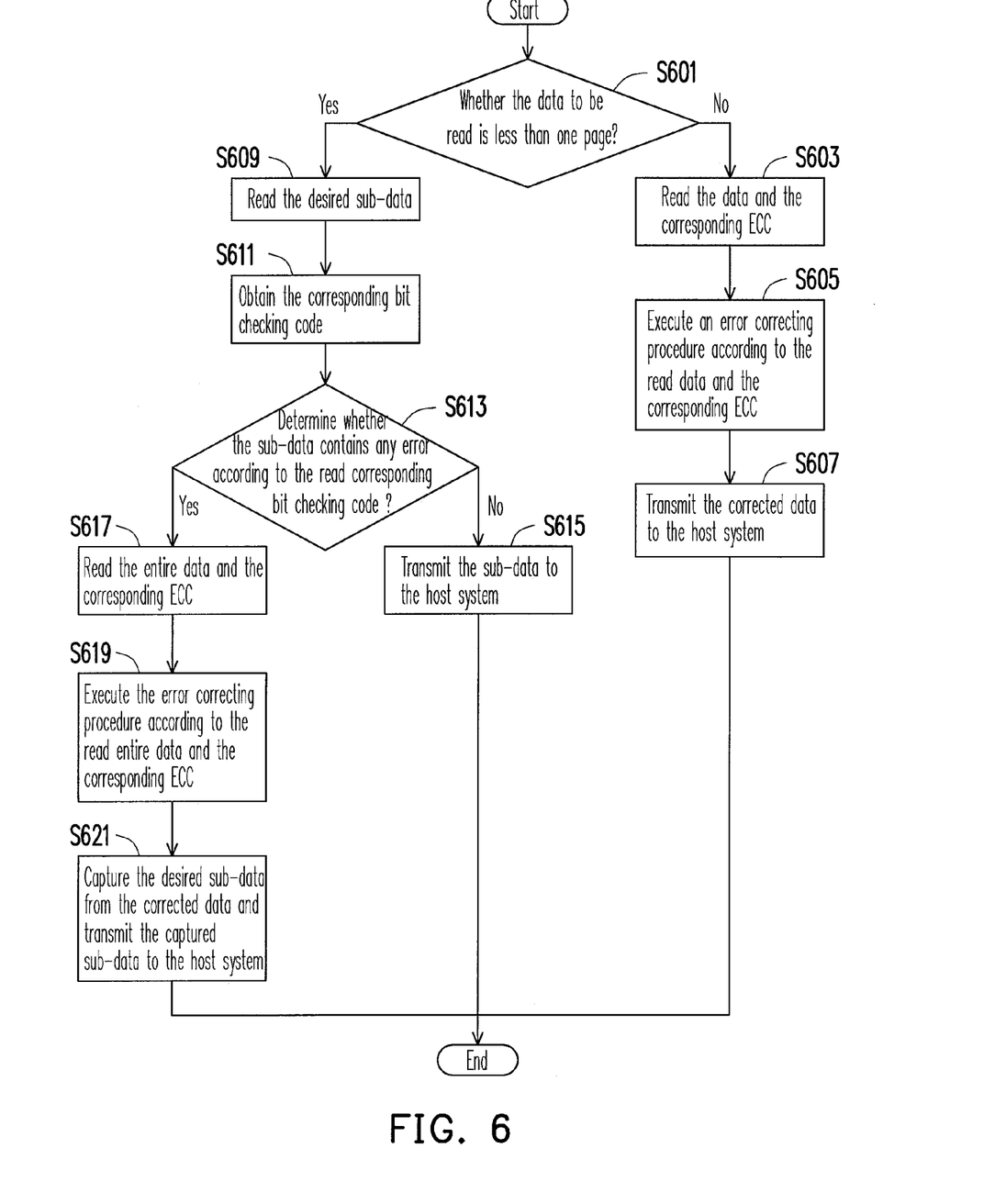
FIG. 6 is a flowchart of data reading process according to an exemplary embodiment of the present invention.

FIG. 6 is a flowchart of data reading process according to an exemplary embodiment of the present invention.

Referring to FIG. 6, when the host system 200 is about to read data from the flash memory storage system 100, in step S601, the flash memory controller 110 determines whether the data to be read by the host system 200 is less than one page. To be specific, the flash memory controller 110 receives a read command from the host system 200 through the host interface unit 110d, and the memory operation unit 110b determines whether the data to be read by the host system 200 is less than one page according to the read address contained in the read command.

For example, in foregoing example that the DATA composed of the sub-data DATA1, DATA2, DATA3, and DATA4 is stored in the page 0 of the physical block 120-0, when the host system 200 only reads part of the sub-data DATA1, DATA2, DATA3, and DATA4 instead of the entire DATA, it is determined that the data to be read by the host system 200 is less than one page.

If it is determined in step S601 that the data to be read by the host system 200 is not less than one page, in step S603, the memory operation unit 110b reads the data and the corresponding ECC from the flash memory chip 120 through the flash memory interface unit 110c, and in step S605, the error correction unit 110e executes an error correcting procedure according to the read data and the corresponding ECC. After that, in step S607, the memory operation unit 110b transmits the corrected data to the host system 200 through the host interface unit 110d. For example, when the host system 200 is about to read the DATA in the page 0 of the physical block 120-0, the flash memory controller 110 reads the DATA and the error correction code (ECC) thereof and executes the error correcting procedure. After that, the flash memory controller 110 transmits the corrected DATA to the host system 200.

If it is determined in step S601 that the data to be read by the host system 200 is less than one page, in step S609, the memory operation unit 110b reads the desired sub-data from the flash memory chip 120 through the flash memory interface unit 110c, and in step S611, the memory operation unit 110b obtains the corresponding bit checking code from the bit checking code table 400, wherein if the bit checking code table 400 is not loaded into the buffer (not shown), the memory operation unit 110b reads the bit checking code table 400 from the flash memory chip 120.

Thereafter, in step S613, the bit checking unit 110f determines whether the sub-data contains any error bit according to the corresponding bit checking code. If the sub-data contains no error bit, in step S615, the memory operation unit 110b transmits the sub-data to the host system 200.

If the sub-data contains error bits, in step S617, the entire data and the corresponding ECC are read from the flash memory chip 120 through the flash memory interface unit 110c, and in step S619, the error correction unit 110e executes the error correcting procedure according to the read entire data and the corresponding ECC. Finally, in step S621, the memory operation unit 110b captures the sub-data to be read by the host system 200 from the corrected entire data and transmits the captured sub-data to the host system 200.

For example, if the host system 200 is about to read the sub-data DATA1 from the page 0 of the physical block 120-0, the flash memory controller 110 reads the sub-data DATA1 and the corresponding bit checking code BCC1 and determines whether the sub-data DATA1 contains any error bit according to the bit checking code BCC1. If the sub-data DATA1 contains no error bit, the flash memory controller 110 directly transmits the sub-data DATA1 to the host system 200. Otherwise, if the sub-data DATA1 contains error bits, the flash memory controller 110 reads the DATA and the error correction code (ECC) thereof from the flash memory chip 120 and executes the error correcting procedure. After that, the flash memory controller 110 captures the sub-data DATA1 from the corrected DATA and transmits the captured sub-data DATA1 to the host system 200.

It should be understood that the execution orders illustrated in FIG. 3 and FIG. 6 are not intended for limiting the present invention, and the steps described above may also be executed in different orders without departing from the spirit and scope of the present invention.

As described above, in the present invention, when data is written into a page of a flash memory, the data is divided into a plurality of sub-data according to the access unit of a host system, and a bit checking code is generated for each sub-data. Subsequently, when the host system reads the sub-data from the page of the flash memory, error bits in the sub-data can be checked according to the corresponding bit checking code, and only when there is error bit detected, the entire data is read from the page of the flash memory and corrected according to the ECC thereof. Thereby, the access efficiency of the flash memory is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data access method, for accessing data in a flash memory, the data access method comprising:
    receiving the data from a host system, wherein the data comprises a plurality of sub-data;
    generating an error correction code (ECC) for the data;
    writing the data and the ECC into the flash memory;
    generating a bit checking code for each of the sub-data by a bit checking unit; and
    writing the bit checking codes into the flash memory by a memory operation unit.

2. The data access method according to claim 1, further comprising establishing a bit checking code table and recording the bit checking codes in the bit checking code table, wherein the step of writing the bit checking codes into the flash memory comprises writing the bit checking code table into the flash memory.

3. The data access method according to claim 2, further comprising establishing a bit checking code mapping table for recording a mapping relationship between the bit checking codes in the bit checking code table and the sub-data.

4. The data access method according to claim 2, further comprising loading the bit checking code table from the flash memory into a buffer and reading the bit checking codes corresponding to the sub-data from the buffer.

5. The data access method according to claim 1, further comprising:
    reading the sub-data from the flash memory;
    reading the bit checking codes corresponding to the read sub-data from the flash memory; and determining whether the read sub-data contains any error according to the read bit checking codes corresponding to the read sub-data, wherein when the read sub-data contains no error, the read sub-data is transmitted to the host system.

6. The data access method according to claim 5, wherein when the read sub-data contains errors, the data access method further comprises:

reading the data and the ECC from the flash memory;
correcting the read data according to the read ECC;
capturing the corrected sub-data from the corrected data; and
transmitting the corrected sub-data to the host system.

7. The data access method according to claim 1, wherein each of the bit checking codes is an error detection code (EDC) or a cyclic redundancy check (CRC) code.

8. The data access method according to claim 1, wherein size of each of the sub-data is a minimum access unit of the host system.

9. A flash memory controller, for accessing data in a flash memory, the flash memory controller comprising:

a microprocessor unit;
a host interface unit, coupled to the microprocessor unit, is used to connect with a host system and receive the data from the host system, wherein the data comprises a plurality of sub-data;
a flash memory interface unit, coupled to the microprocessor unit, is used to connect with the flash memory;
a memory operation unit, coupled to the microprocessor unit;
an error correction unit, coupled to the microprocessor unit, is used to generate an ECC for the data, wherein the memory operation unit writes the data and the ECC into the flash memory; and
a bit checking unit, coupled to the microprocessor unit, is used to generate a bit checking code for each of the sub-data, wherein the memory operation unit writes the bit checking codes into the flash memory.

10. The flash memory controller according to claim 9, wherein the memory operation unit further establishes a bit checking code table to record the bit checking codes.

11. The flash memory controller according to claim 10, wherein the memory operation unit further establishes a bit checking code mapping table to record a mapping relationship between the bit checking codes in the bit checking code table and the sub-data.

12. The flash memory controller according to claim 10, wherein the memory operation unit further loads the bit checking code table from the flash memory into a buffer and reads the bit checking codes corresponding to the sub-data from the buffer.

13. The flash memory controller according to claim 9, wherein the memory operation unit further reads the sub-data from the flash memory and reads the bit checking codes corresponding to the read sub-data from the flash memory, wherein the bit checking unit determines whether the read sub-data contains any error according to the read bit checking codes corresponding to the read sub-data, wherein when the read sub-data contains no error, the memory operation unit transmits the read sub-data to the host system.

14. The flash memory controller according to claim 13, wherein when the read sub-data contains errors, the memory operation unit reads the data and the ECC from the flash memory, and the error correction unit corrects the read data according to the read ECC, wherein the memory operation unit captures the corrected sub-data from the corrected data and transmits the corrected sub-data to the host system.

15. The flash memory controller according to claim 9, wherein the bit checking unit is an error detecting circuit, and each of the bit checking codes is an EDC.

16. The flash memory controller according to claim 9, wherein the bit checking unit is a cyclic redundancy check circuit, and each of the bit checking codes is a CRC code.

17. The flash memory controller according to claim 9, wherein size of each of the sub-data is a minimum access unit of the host system.

18. A flash memory storage system, comprising:

a flash memory; and
a flash memory controller, coupled to the flash memory, is used to receive data from a host system, wherein the data comprises a plurality of sub-data,
wherein the flash memory controller generates an ECC for the data and writes the data and the ECC into the flash memory,
wherein the flash memory controller has a bit checking unit for generating a bit checking code for each of the sub-data and a memory operation unit for writing the bit checking codes into the flash memory.

19. The flash memory storage system according to claim 18, wherein the flash memory further comprises a bit checking code table to record the bit checking codes.

20. The flash memory storage system according to claim 19, wherein the flash memory controller further establishes a bit checking code mapping table to record a mapping relationship between the bit checking codes in the bit checking code table and the sub-data.

21. The flash memory storage system according to claim 20 further comprising a buffer memory, wherein the flash memory controller further loads the bit checking code table from the flash memory into the buffer and reads the bit checking codes corresponding to the sub-data from the buffer.

22. The flash memory storage system according to claim 18, wherein the flash memory controller further reads the sub-data from the flash memory and the bit checking codes corresponding to the read sub-data from the flash memory, wherein the flash memory controller determines whether the read sub-data contains any error according to the read bit checking codes corresponding to the read sub-data, wherein when the read sub-data contains no error, the flash memory controller transmits the read sub-data to the host system.

23. The flash memory storage system according to claim 22, wherein when the read sub-data contains errors, the flash memory controller reads the data and the ECC from the flash memory and corrects the read data according to the read ECC, wherein the flash memory controller captures the corrected sub-data from the corrected data and transmits the corrected sub-data to the host system.

24. The flash memory storage system according to claim 18, wherein each of the bit checking codes is an EDC or a CRC code.

25. The flash memory storage system according to claim 18, wherein size of each of the sub-data is a minimum access unit of the host system.

* * * * *